Figure 1:
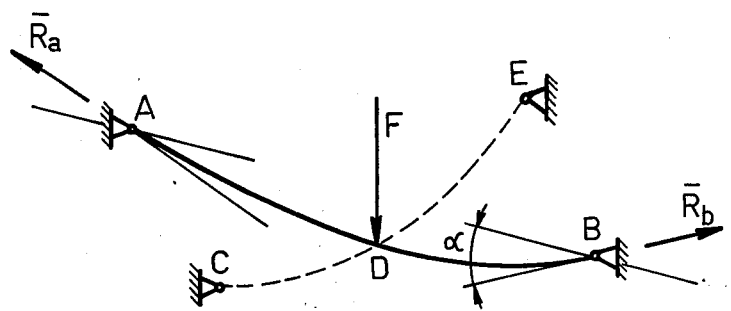

United States Patent [19]

Kovács

[11] 4,344,495

[45] Aug. 17, 1982

[54] EQUIPMENT FOR THE MEASUREMENT OF MINUTE WEIGHT FORCES

[75] Inventor: Sándor Kovács, Budapest, Hungary

[73] Assignee: Vasipari Kutato Intezet, Hungary

[21] Appl. No.: 160,355

[22] Filed: Jun. 17, 1980

[30] Foreign Application Priority Data

Nov. 6, 1979 [HU] Hungary .............................. VA 1556

[51] Int. Cl.$^3$ ........................ G01G 3/14; G01G 21/24
[52] U.S. Cl. .................................... 177/211; 177/255
[58] Field of Search ................................ 177/255, 211

[56] References Cited

U.S. PATENT DOCUMENTS 3,985,025 10/1976 Ormond ........................ 177/255 X
4,029,163 6/1977 Allen ................................. 177/255
4,067,408 1/1978 Dodds et al. .................... 177/255 X Primary Examiner—George H. Miller, Jr.
Attorney, Agent, or Firm—McGlew and Tuttle

[57] ABSTRACT

The equipment according to the invention is suitable for the measurement of very small weight forces by conversion of the forces to be measured to 5–100-fold value. The equipment has two units, each containing at least three measuring arms, where the connection points of the measuring arms are attached to an extension bar, and the free ends of the measuring arms are connected to a single rigid element in such a way, that the connection points of the measuring arms are outside the planes fixed by the ends attached to the rigid element. The measuring arms and extension bar in the equipment are formed as pull rods. The measuring arms are arranged symmetrically or asymmetrically, and their number is optional. Infinite number of measuring arms may be used, in which case they are formed as membranes in the practice. Force-meter sensors, suitably elongation measuring resistors are built into the measuring arms, thus the output signal gives directly the measured value.

17 Claims, 6 Drawing Figures

EQUIPMENT FOR THE MEASUREMENT OF MINUTE WEIGHT FORCES

The invention relates to an equipment for the measurement of minute weight forces. Measurement of the weight forces is one of the most widely used measuring tasks. The most diverse devices have been invented for this purpose in the course of time. One of the earliest types of balance utilizes the principle of equal-, or unequal-armed balance. In these balances the equilibrium is set by loading them with weight or by shifting of the weight. The measuring number of the measured mass is determined by counting of the loaded weights, or on the basis of their displacement.

Several new physical phenomena have been used recently for measurement of the weight force. Such phenomena are the elongation, or turn caused by the elastic deformation, furthermore by the conversion of the mechanical, electrical, magnetic optical, etc. characteristics arising as a result of force effect.

With the electronics gaining ground, the electric measuring methods have been generally used, based on the piezoresistive phenomenon. The strain gauges made on this basis are suitable for the measurement of the weight force and other forces in the range extending from a few milligrams to several hundred tons.

However, for the realization of any of the mentioned measuring principles such mechanical device is necessary, with the aid of which the force to be measured and the parameters used for the measurement can be brought into equilibrium.

In case of equilibrium, the line of action of the force to be measured mostly deviates from the line of action of the force being in equilibrium. This is the situation for instance in case of the balances based on the use of levers. If, however, an internal mechanical stress-field has to be brought about in the part pertaining to the device in order to attain the equilibrium, i.e. the measuring number is obtained through the material characteristics, then the weight force to be measured and the stress field developed for the equilibrium have to coincide up to the line of action of the resultant taken on a specific surface.

Also such measuring solution is known in which the lines of action intersect each other. This is the case when the two points of application and the supporting point do not line up, or when for instance pendulum is used. In these devices the measurement is made possible by the known geometrical conditions and forces bringing about the known equilibrium. However, always a single force is applied for the measurement.

Also such measuring tasks exist, when the measuring number of the force to be measured is determined in the knowledge of two or several forces. Such is for instance the measurement with the aid of the two-support beam.

The described measuring principles and practical solutions enable the measurement of small forces as well. However, with advance of the technique the demand arises for the accurate measurement of very small forces by application of the methods of mechanics and electricity.

General application of the electrical methods is limited only by the fact, that the available weight force can not develop sufficiently high mechanical stress, to create measurable deformation or transformation of the material characteristics. Consequently such device is required which increases the available force to be measured. Such devices increase the force to be measured in the meaning equipment as in a transformer. Such device is for instance the unequal-armed lever, increasing the force to be measured in proportion of the arms. This means that the greater force is to be brought about the less is the length of the arm to be selected to the given borderline.

In these type of solutions the attainable accuracy is limited by the production tolerances, thus in certain measuring range accurate measurement is no longer possible. Besides that, the use of these devices, the time constant and other characteristics of the system will change unfavourably.

The present invention is aimed at the development of such equipment for the measurement of minute forces, in which the 5–100-fold magnification of the forces to be measured is realizable, the size variance of the production does not influence the measurement to any significant degree and thus the equipment is suitable for accurate measurement.

The task according to the invention is solved by having an equipment consisting of two units each containing at least three measuring arms in which the connection points of the measuring arms are attached to a single, rigid element in such a way, that the connection points of the measuring arms in the units are outside the planes fixed by the ends attached to the rigid element.

The measuring arms and the extension bars in the equipment according to the invention are formed suitably as pull rods.

The measuring arms may be of symmetrical or asymmetrical arrangement. In case of symmetrical arrangement the measuring arms of the upper unit are displaced at 180° in relation to the measuring arms of the lower unit.

The line of application of the force to be measured preferably coincides with the geometrical axis of the extension bar in order to perform the adding up in a simple way.

The measuring arms and extension bar in the equipment may be provided with an adjusting device to bring about prestressing in order to eliminate inaccuracies.

Force meter-sensors, suitably elongation sensor resistors are built into the measuring arms. The elongation sensor resistors are connected into a half or full bridge, thus the obtained output signal is in proportion with the force to be measured.

Figure 2:
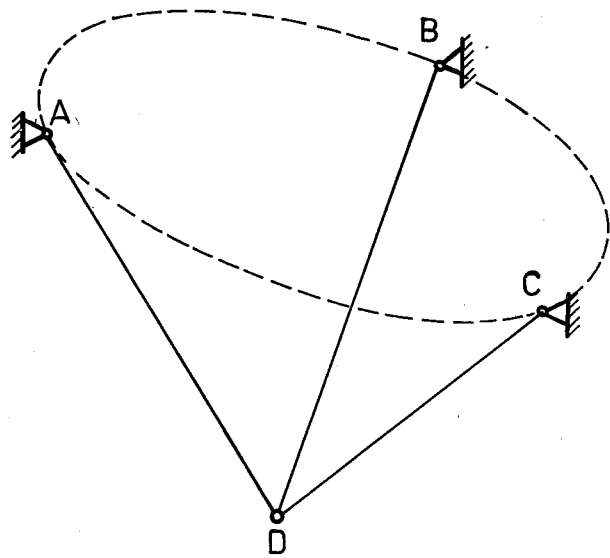
Figure 3:
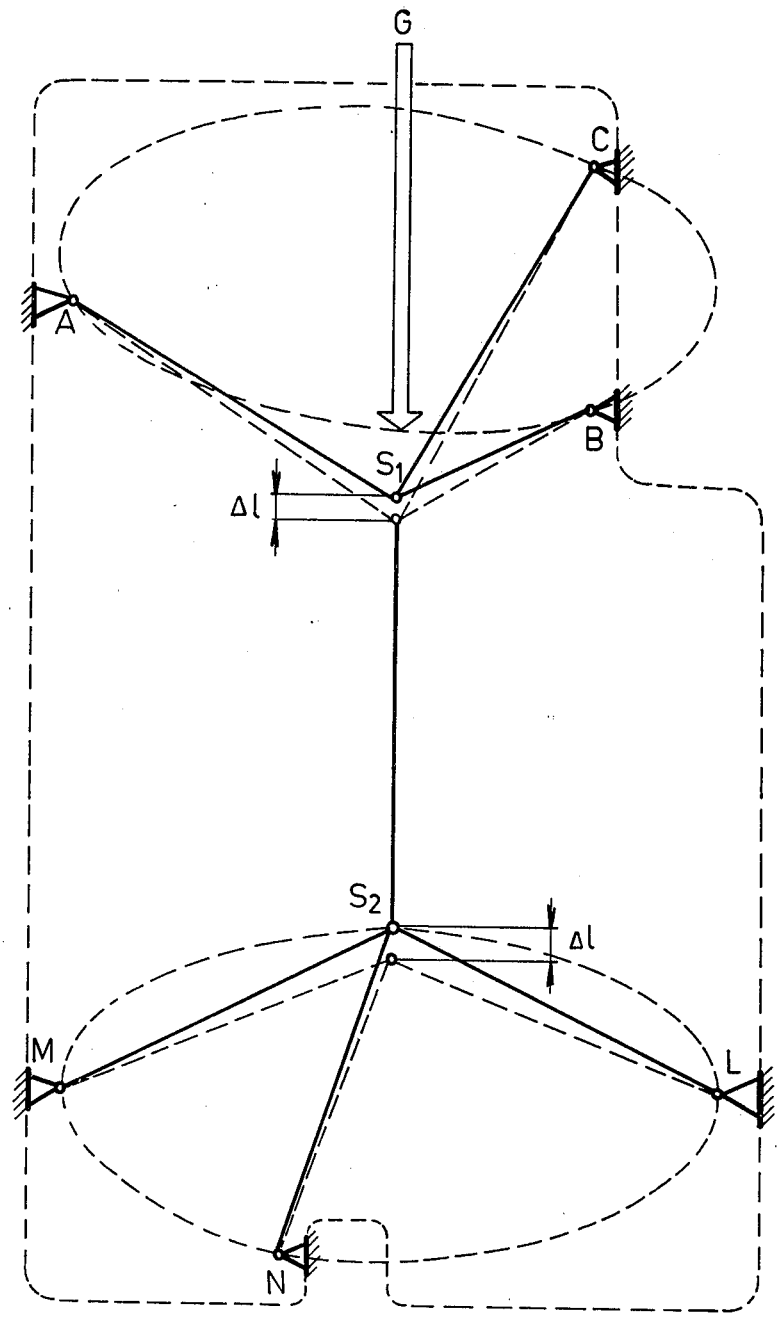
Figure 4:
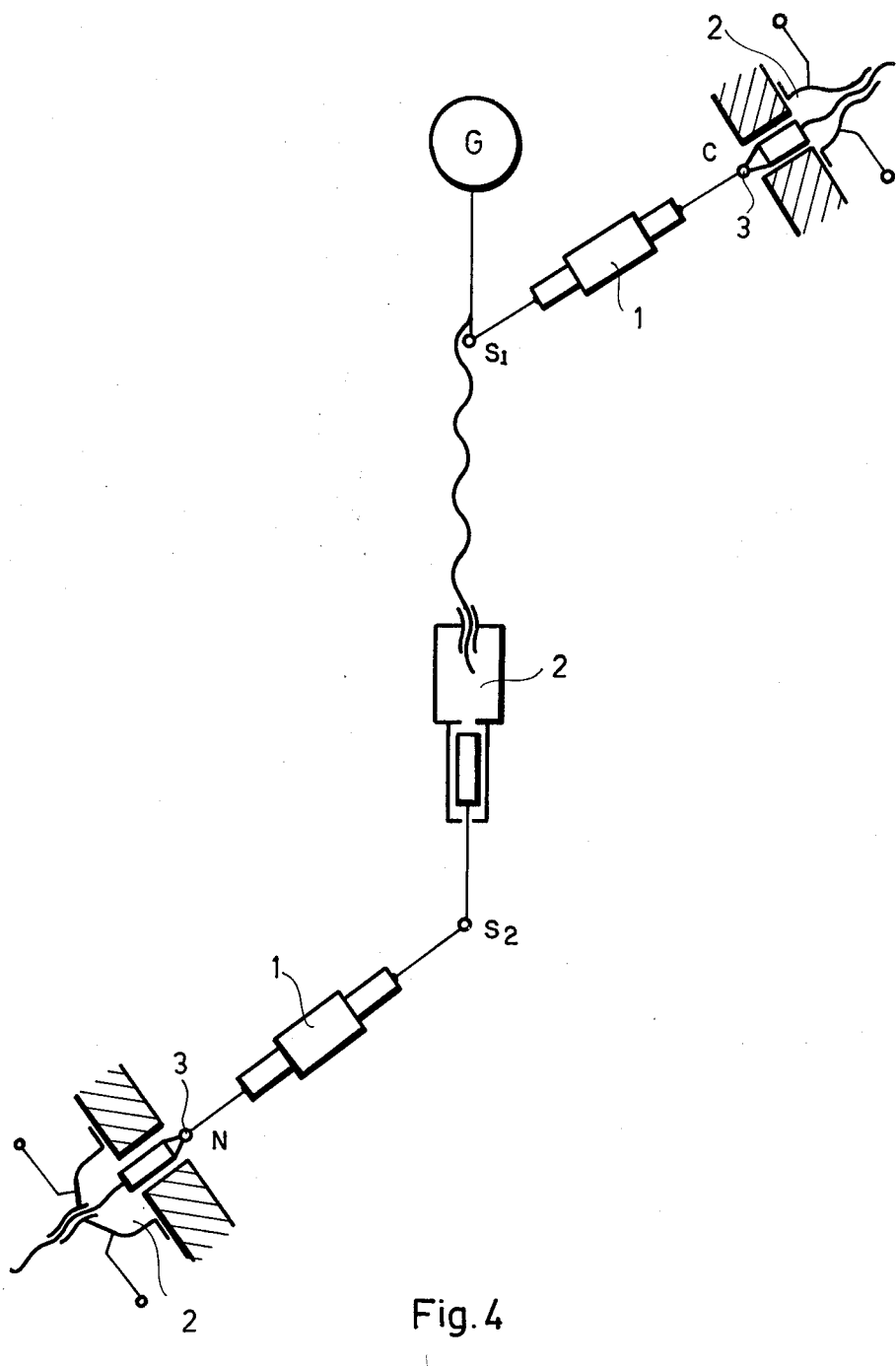
Figure 5:
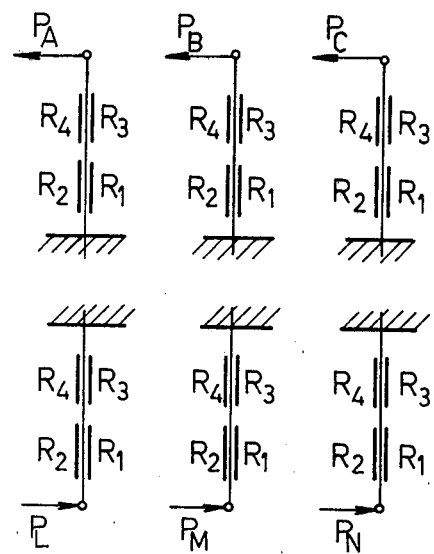
Figure 6:
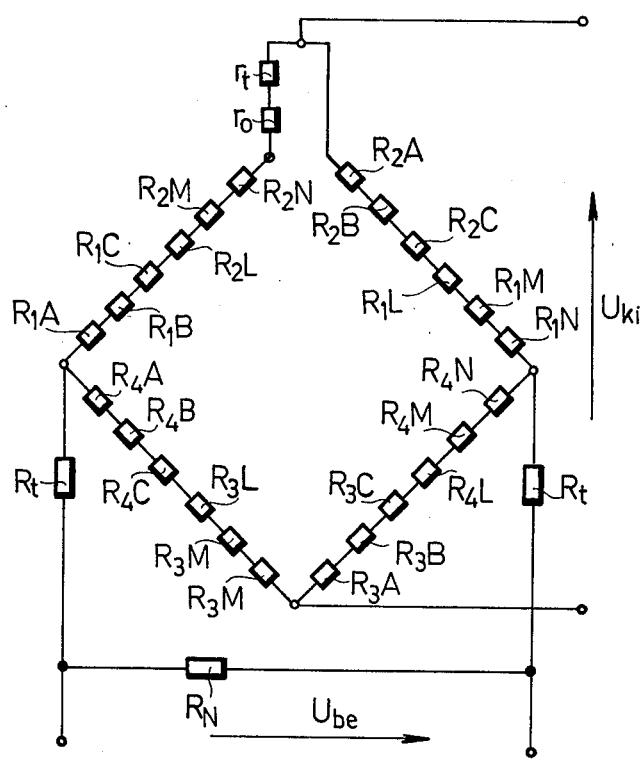

Further details of the invention are described with the aid of diagrams as follows:

FIG. 1: diagram showing the basic idea of the invention;

FIG. 2: diagram showing the conventional trestle;

FIG. 3: schematic diagram of a suitable embodiment of the equipment according to the invention;

FIG. 4: detail of a concrete embodiment of the equipment according to the invention;

FIG. 5: arrangement of the measuring resistors;

FIG. 6: diagram of the measurement when measuring resistors are used.

The invention is based on the following order of ideas. According to the mechanical practice it is known that infinite forces are necessary for the horizontal stretching of a cord. FIG. 1 illustrates that the force F acting in point D of the cord fixed in points A and B—depending on angle α—very great reaction forces $R_a$ and $R_b$ may appertain. Points A, B and D are in the same plane and force F brings about a stable position. However, the vibrations always present in the mechanical system may easily shift the point D, thus making the system unstable.

This can be prevented by fixing point D in points C and E being in the direction of CE deviating from the direction of AB. This way this easy to upset stable state can be maintained with the aid of forces in direction CD and DE. However, the system is statically uncertain.

Fixed statical state can be ensured only by such system of points A, B and C, which has a common point D and in which bars or cords are arranged in the AB, BD and CD directions. This system has been known for a long time in the mechanics as trestle (See FIG. 2). Thus with the joint application of the cord principle and trestle such system can be brought about, which permits the determination of a positively acting force by measurement of the bar forces and in knowledge of the geometrical conditions of the system.

The equilibrium conditions of the trestle shown in FIG. 2 can be examined according to the formation of connection point D and points A, B, C. According to our invention, rods (or chords) AD, BD and CD form measuring arms. The equipment shown in FIG. 3 is constructed by the interconnection of two trestles. According to the solution illustrated in FIG. 3, the equipment is a structure of joints and bars in which the joints in points A, B and C are arranged at equal distance from each other. Similarly the joints in points L, M and N are arranged along a circular arc. The free ends of the trestle bars are connected in points $S_1$ and $S_2$ each of them corresponding to point D of FIG. 2. Points $S_1$ and $S_2$ are connected with an extension bar. When force G acts on this system being in equilibrium, the points $S_1$ and $S_2$ at the ends will shift at a value of $\Delta L$, thus the bars of the upper unit will be elongated, while the bars of the lower unit will be compressed. After the deformation the system is again in equilibrium.

If the characteristics (geometry, magnitude of bar forces) of the system are known before the action of the weight force G, the magnitude of the unknown weight force G can be determined from the altered magnitude of the bar forces. Points A, $S_1$, $S_2$ and L are in a common plane and represent the end points of $AS_1$ measuring arm, $S_1S_2$ extension bar and $S_2L$ measuring arm, respectively. In the same way, points B, $S_1$, $S_2$, M and points C, $S_1$, $S_2$ and N represent measuring arms $BS_1$ and $CS_1$, extension bar $S_1S_2$ as well as measuring arms $S_2M$ and $S_2N$. The forces arising in the bars or arms may be determined by any known means. In practice, strain gauges may advantageously be applied. A system using such strain gauge is presented in FIG. 4. Here for the sake of simplicity only the bars $CS_1$, $S_1S_2$ and $S_2N$ being in one plane (see FIG. 2) are shown. The diagram shows force-meter sensors 1, which are preferably strain gauges, built into the measuring arms $CS_1$ and $S_2N$. It must be noted, however, that the same results may be achieved, if the sensors are applied outside the points C or N (as is shown in FIG. 5). In addition, all rods are provided with an adjusting device 2 in order to realize the prestressing of the system. Due to the production wrinkles, clearances of fit, and to the uncertainty of the line of action of the forces to be measured, it is advisable to create a certain preloading in the system, thereby eliminating the mentioned uncertainties. In the presented solution the measuring arms of the units are connected to joints 3, at points C and N, the position of which can be varied with a threaded adjusting device, while similarly a threaded adjusting device 2 is built into the extension bar $S_1S_2$; connecting the two measuring arms.

The measurement with the equipment according to the invention is performed in such a way, that after adequate prestressing P=0 state is set on the metering sensors 1, then load G is applied on the system. In this case the bars of the equipment will be elongated, or shortened, and such reaction forces will arise in the pertinent joints, which are in equilibrium with the forces measured in the metering sensors 1. By the vectorial addition of the read off values the unknown loading force G can be easily determined.

It is advisable to construct the equipment in such a way, that the line of action of the loading force G to be measured should coincide with the geometrical axis of the extension bar, because the calculation will be easier this way. Naturally the addition can be performed in any other case.

In view of the fact that the state of equilibrium will arise between the force vectors in the equipment according to the invention, the measurement actually represents vectorial addition, or deduction. This can be solved simply by addition of electric voltages, when the output signal in proportion with the load can be directly produced.

It is advisable to use elongation sensor resistance sufficient to develop the full or half bridge in the measuring bodies. FIG. 5 shows the arrangement of the resistors R in the measuring bodies, when a full bridge is formed by the resistors. The demand for highly accurate force measurement is fulfilled by measuring the force components $P_A$, $P_B$, $P_C$ or $P_L$, $P_M$ and $P_N$ with separate dynamometer. For this purpose a full bridge is built up according to FIG. 6 with the four resistors $R_1$, $R_2$, $R_3$ and $R_4$ on the measuring bodies. The bridge is provided with resistors $r_o$ and $r_t$ for zero position adjusting and temperature balancing as well as resistors $R_t$ and $R_N$ for adjusting sensibility and input resistance. The measuring cells of the first and second unit are parallel connected and the two output signals are added up. Thus the output signal in proportion with the force to be measured is obtained.

In view of the foregoing, it is apparent, that the solution according to the invention permits the step-up transformation of very small forces to optional extent, and this way the accurate measurement. Also each unit in the introduced example contained three bars, the equipment can be constructed with the use of more measuring arms as well. A construction containing infinite number of measuring arms will be obtained if membranes are used in the equipment as units connected to the extension bar. The measurement and calculation can be performed even in such equipment where the bars are not symmetrically arranged. Also such measuring device can be constructed in which the jointed bars are replaced by clamped beams, however, in this case the arising moments have to be taken into consideration. In case of such solution the use of bars with equal strength is advisable.

What we claim is:

1. Equipment for the measurement of small weight forces, characterized by having two units each containing three measuring arms, each measuring arm having a first end connected with each other in one point, where the connection points ($S_1$, $S_2$) of the measuring arms of each unit are attached to an extension bar and the second ends of the measuring arms are attached to a single rigid element in such a way that the connection points at said first ends of the measuring arms in the units are outside the planes defined by the second ends of the measuring arms that are attached to the rigid elements.

2. The equipment as claimed in claim 1, characterized by forming the measuring arms as pull rods.

3. The equipment as claimed in claim 1, characterized by forming the extension bar as pull rod.

4. The equipment as claimed in claim 1, characterized by pivotably attaching the measuring arms to the rigid element.

5. The equipment as claimed in claim 1, characterized by having the measuring arms in an asymmetrical arrangement.

6. The equipment as claimed in claim 1, characterized by forming at least one of the units with an infinite number of measuring arms as membranes.

7. The equipment as claimed in claim 1, characterized by having the line of application of the force (G) to be measured coinciding with the geometrical axis of the extension bar.

8. The equipment as claimed in claim 1, characterized by providing the measuring arms with an adjusting device (2).

9. The equipment as claimed in claim 1, characterized by providing the extension bar with an adjusting device (2).

10. The equipment as claimed in claim 1, characterized by attaching the measuring arms to the rigid element as clamped beams.

11. The equipment as claimed in claim 10, characterized by forming the measuring arms as elements of equal strength.

12. The equipment as claimed in claim 1, characterized by having the measuring arms in a symmetrical arrangement.

13. The equipment as claimed in claim 12, characterized by having the two units positioned one above the other and by having the measuring arms of the upper unit displaced at 180° in relation to the measuring arms of the lower unit.

14. The equipment as claimed in claim 1, characterized by having force-meter sensors (2) built into the measuring arms.

15. The equipment as claimed in claim 14, characterized by having elongation sensor resistors as force-meter sensors (2).

16. The equipment as claimed in claim 15, characterized by connecting the elongation sensor resistors into half a bridge.

17. The equipment as claimed in claim 15, characterized by connecting the elongation sensor resistors into a full bridge.

* * * * *